(12) United States Patent
Boulay

(10) Patent No.: US 10,464,175 B1
(45) Date of Patent: Nov. 5, 2019

(54) PORTABLE, MULTI-PURPOSE WORKSTATIONS

(71) Applicant: Shane Boulay, Huntington Beach, CA (US)

(72) Inventor: Shane Boulay, Huntington Beach, CA (US)

( * ) Notice: Subject to any disclaimer, the term of this patent is extended or adjusted under 35 U.S.C. 154(b) by 469 days.

(21) Appl. No.: 15/207,361

(22) Filed: Jul. 11, 2016

Related U.S. Application Data

(60) Provisional application No. 62/190,595, filed on Jul. 9, 2015.

(51) Int. Cl.
| | |
|---|---|
| *B23K 37/04* | (2006.01) |
| *B23K 9/32* | (2006.01) |
| *B23K 7/10* | (2006.01) |
| *B23K 9/013* | (2006.01) |

(52) U.S. Cl.
CPC .......... *B23K 37/0461* (2013.01); *B23K 7/10* (2013.01); *B23K 9/013* (2013.01); *B23K 9/32* (2013.01)

(58) Field of Classification Search
CPC .......... B23K 7/10; B23K 9/013; B23K 9/324; B23K 5/24; B23K 37/0461; B23K 5/10; B23K 5/22; B23Q 3/02
USPC ... 269/136, 137, 138, 139, 15, 16, 266, 900; 29/281.1; 266/65
See application file for complete search history.

(56) References Cited

U.S. PATENT DOCUMENTS

| | | | |
|---|---|---|---|
| 2,862,101 A | 11/1959 | Klinke | |
| 5,938,185 A * | 8/1999 | Kletter | A47J 47/005 269/15 |
| 2014/0203485 A1* | 7/2014 | Forlong | B23K 37/0461 269/309 |

OTHER PUBLICATIONS

Kalamazoo Hybrid Fire Grills, Use and Care Guide, 2012 https://kalamazoogourmet.com/literature/Kalamazoo_Outdoor_Gourmet_Hybrid_Fire_Grills_Use_and_Care_Guide.pdf (Year: 2012).*

(Continued)

*Primary Examiner* — Monica S Carter
*Assistant Examiner* — Abbie E Quann
(74) *Attorney, Agent, or Firm* — Umberg Zipser LLP

(57) ABSTRACT

Embodiments of multipurpose workstations are disclosed having a small, portable housing that defines an interior space, into which a conductive, uneven surface having a plurality of differing heights is disposed. The conductive surface can include a plurality of openings sized and disposed to provide for an air gap within an opening or below the surface. The workstations can further include an upper removable conductive flat metal surface, and a tray disposed below the uneven, conductive surface that collects material that passes through the openings.

11 Claims, 15 Drawing Sheets

(56) References Cited

OTHER PUBLICATIONS

Kalamazoo Hybrid Fire Grills, Use and Care Guide, 2012 https://kalamazoogormet.com/literature/Kalamazoo_outdoor_hybrid_grills_use_and_care)guide.pdf (Year: 2012).*

BuildPro™ 8' Welding Table—Standard Finish, htttp://www.arc-zone.com/index.php?main_page=product_info&cPath=585_2278_2279&products_id=9691 Jul. 17, 2017 ( 2pgs.).

FixturePoint Convertible Welding Table, Portable Welding Tables, htttp://www.arc-zone.com/index.php?main_page=product_info&products_id=9710, Jul. 17, 2017 ( 2pgs.).

Miller Electric Dec. 1, 2009, Article, "Miller's All-in-one Arc Table Workstation for Welding and Metalworking—Custom Classics Trucks Magazine" http:/ hotrod.com/news/0912cct-millers-arc-table-workstation-welding-metalworking/, Jul. 17, 2015 (8 pages).

Miller Electric ArcStation Workbench, Work Surface 29×29 Zoro.com/milller-electric-arcstation-workbench-work-surtace-29×29-300837/i/G3728137/?utm_sourc3e=google_shopping&utm_medium=cpc&utm_c . . . , Jul. 17, 2015 (8 pages).

\* cited by examiner

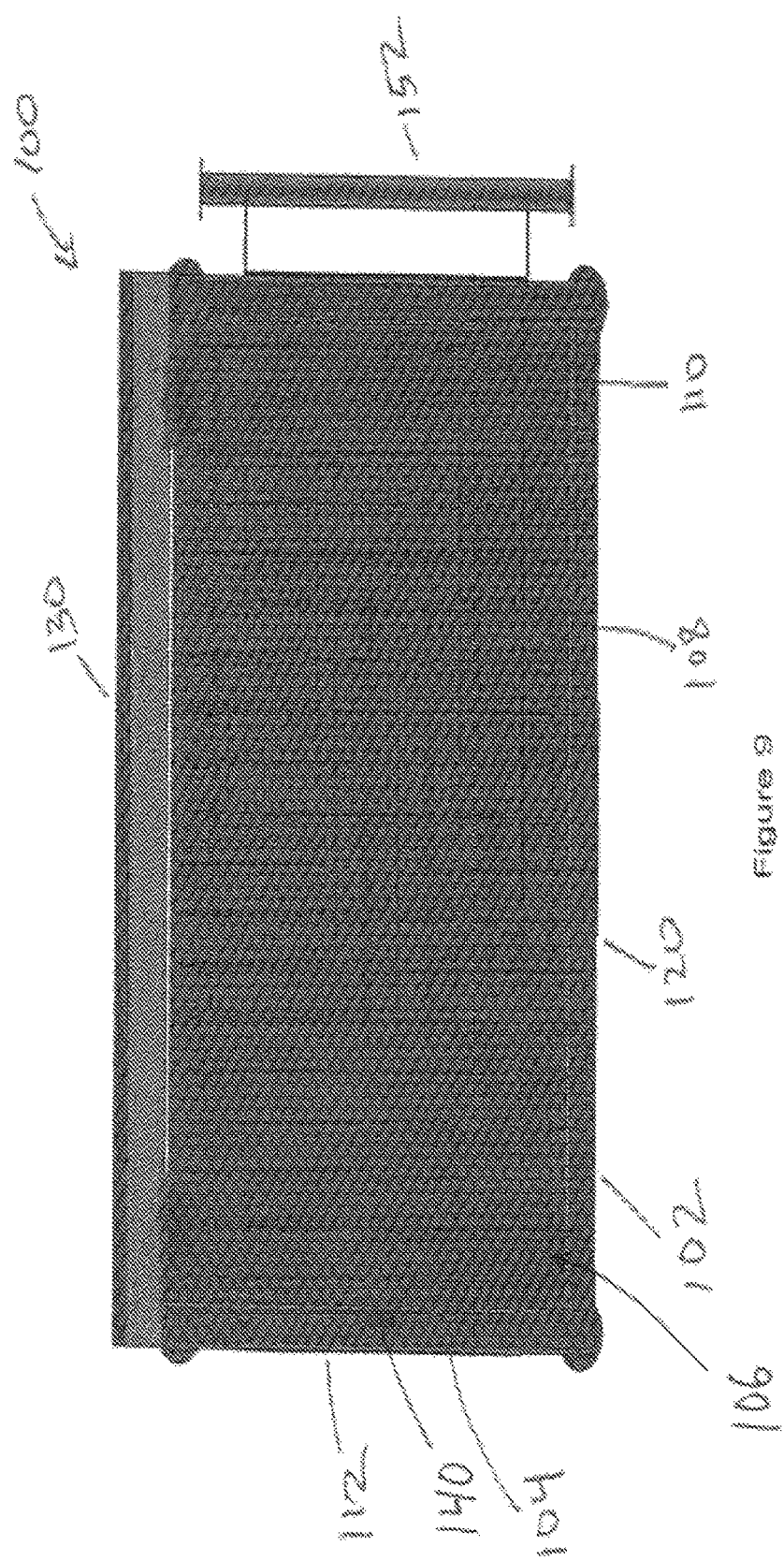

PORTABLE, MULTI-PURPOSE WORKSTATIONS

This application claims priority to U.S. Provisional Application No. 62/190,595, filed Jul. 9, 2015. All extrinsic materials identified herein are incorporated by reference in their entirety.

FIELD OF THE INVENTION

The field of the preferred embodiment is in multipurpose workstations relating to metal working and/or food preparation use, and specifically portable multipurpose workstations for consumers.

BACKGROUND

The following background discussion includes information that may be useful in understanding the present invention. It is not an admission that any of the information provided herein is prior art or relevant to the presently claimed invention, or that any publication specifically or implicitly referenced is prior art.

To Applicant's knowledge, there currently does not exist a portable, multipurpose workstation for manually controlled arc, and/or flame based metal cutting processes, such as for use in a small garage, school workshop, onsite repair facility, marine or shipboard workshop, etc. . . . or other structure. Although large, industrial computer numerically controlled (CNC) cutting centers exist, usually these cutting centers are massive and immobile structures designed for a specific purpose, namely they are automated CNC, and as such, are not portable or configured for manually-operated use. This lack of a portable, consumer workstations for non-automated "small scale" manually-operated arc and/or flame-based metal cutting processes, typically would require a user to clamp the material to be cut off the edge of a common welding table or work bench. Subsequently during the arc cutting process, the sparks and hazardous molten slag produced by the cut sprays downwardly upon the user's feet and legs, while also endangering any hoses or cords laying on the ground below from being cut or punctured by the molten falling material.

All extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus there remains a considerable need for apparatuses that can conveniently provide the user with a multipurpose workstation configured to allow for the multipurpose use of welding equipment, general workshop tasks, and non-automated manual metal cutting processes including manually-operated metal cutting processes using the same workstation, with provisions for the safe capture and containment of resulting molten metal spray and sparks produced during the cutting process.

SUMMARY OF THE INVENTION

The inventive subject matter provides apparatus, systems, and methods of workstations configured for multiple purposes. Preferred workstations comprise a housing that defines an interior space within which a plurality of slats may be disposed. The slats define a conductive, uneven surface having a plurality of differing heights and creating a plurality of openings sized and disposed to provide for an air gap within an opening or below the surface. First and second sets of slats preferably are disposed in a perpendicular relationship with one another to create a grid in which each of the slats of the first set intersect with each of the slats of the second set. A tray is preferably disposed below the conductive surface to collect molten slag and other material that passes through the openings.

The inventive concepts discussed herein advantageously ameliorate the problems discussed above with prior art structures, and allow users skilled in the art of metal working to use any manually-operated arc, and/or flame-based cutting processes with the workstation, while minimizing or eliminating the hazards from molten slag and sparks produced during the manual arc and/or flame based cutting processes.

The inventive concepts discussed herein solves the problem of known workstations not being capable of providing for, or serving the dual purpose use as a safe, supportive apparatus for metal working welding processes, as well as manually operated arc, and/or flame based metal working cutting processes of flat metal products, while remaining portable. An additional preferred embodiment also provides a solution for the safe capture and containment, and subsequent removal of the hazardous molten slag and sparks produced during the manual arc, and/or flame based cutting processes.

Methods of cutting a piece of material using a manually-operated process are also contemplated. In such methods, a workstation is provided having a housing that defines an interior space within which a conductive, uneven surface is disposed having a plurality of differing heights. The conductive surface comprises a plurality of openings sized and disposed to provide for an air gap. The workstation also comprises a tray disposed below the surface and configured to collect material that passes the openings. Instructions are provided to a user to place a material on the conductive, uneven surface, and cut the material using a manually-operated arc or a flame-based metal cutting process. The openings in the conductive surface advantageously provide an air gap below all or a portion of the material.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 8 is a right, front perspective view of the workstation of FIG. 1 in a partially-opened configuration.

FIG. 9 is a top view of the workstation of FIG. 1 with the cover removed, and depicting a metal grid.

DETAILED DESCRIPTION

Figure 1:
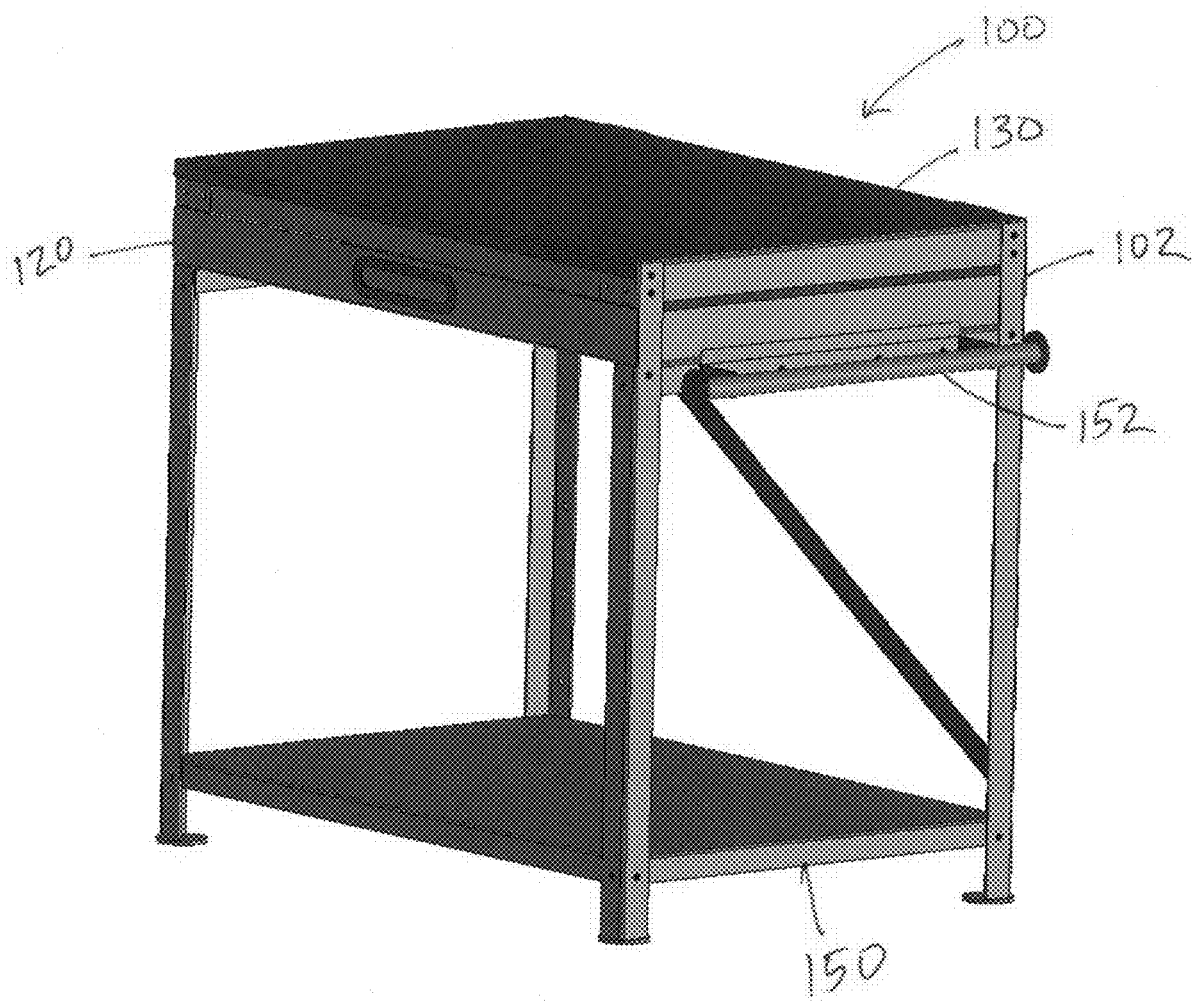
FIG. 1 is a right, front perspective view of a first embodiment of a workstation in a closed state.
Figure 2:
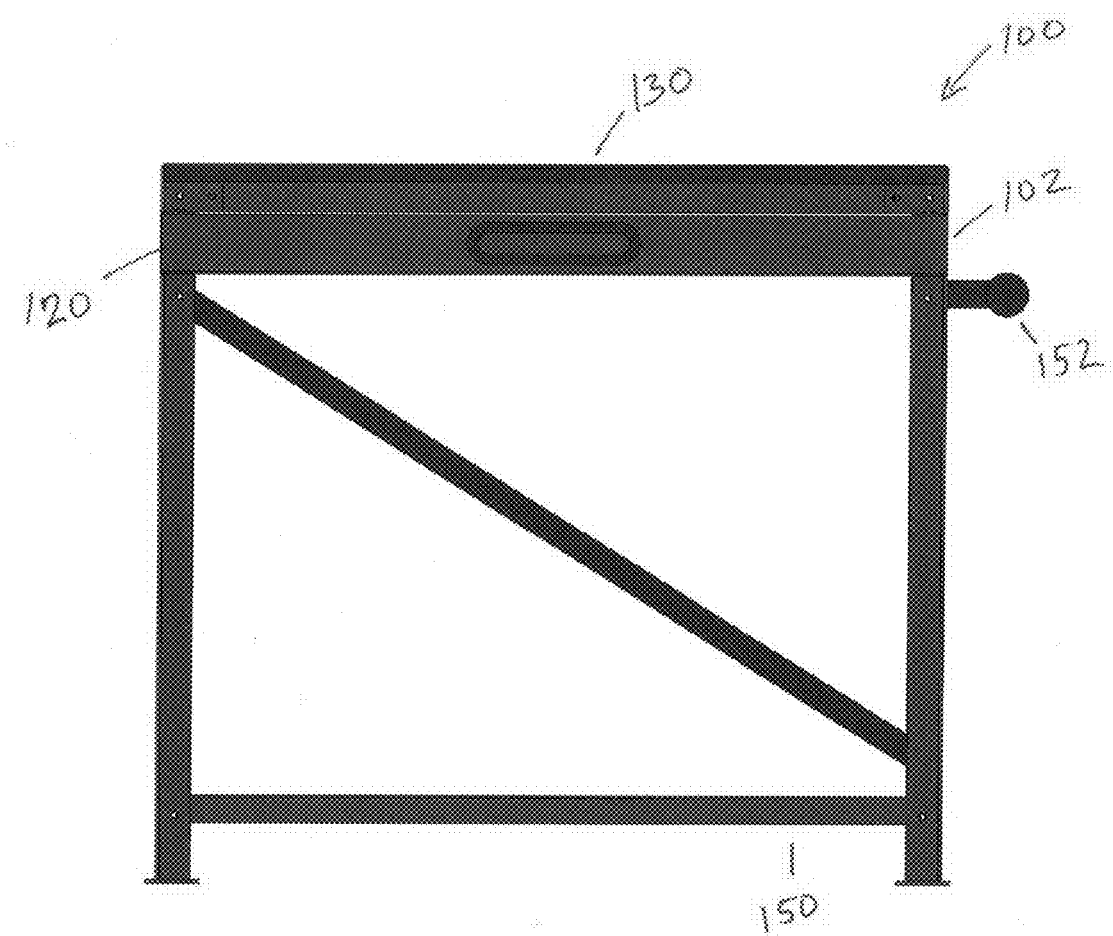
FIG. 2 is a front view of the workstation of FIG. 1.
Figure 3:
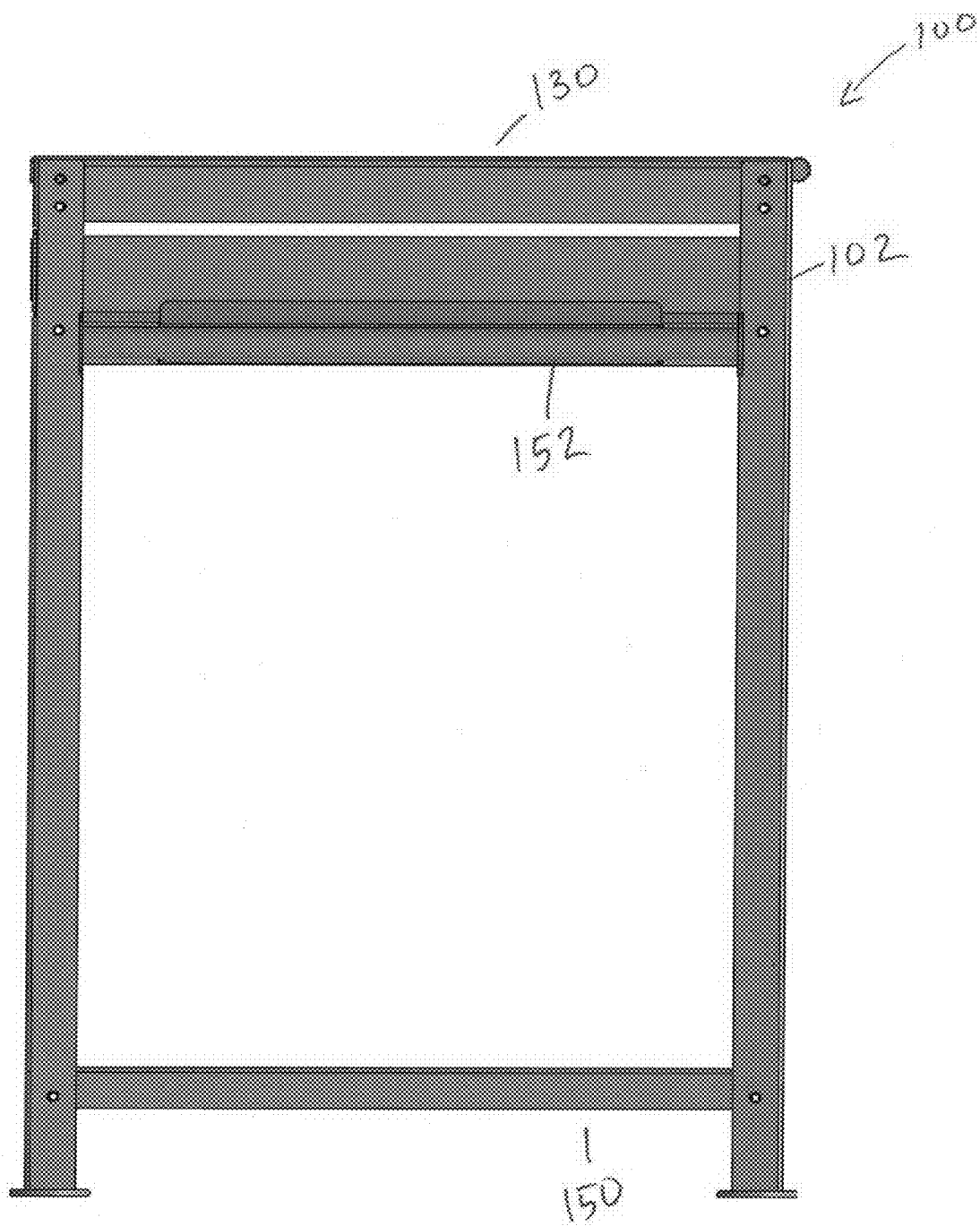
FIG. 3 is a right side view of the workstation of FIG. 1.
Figure 4:
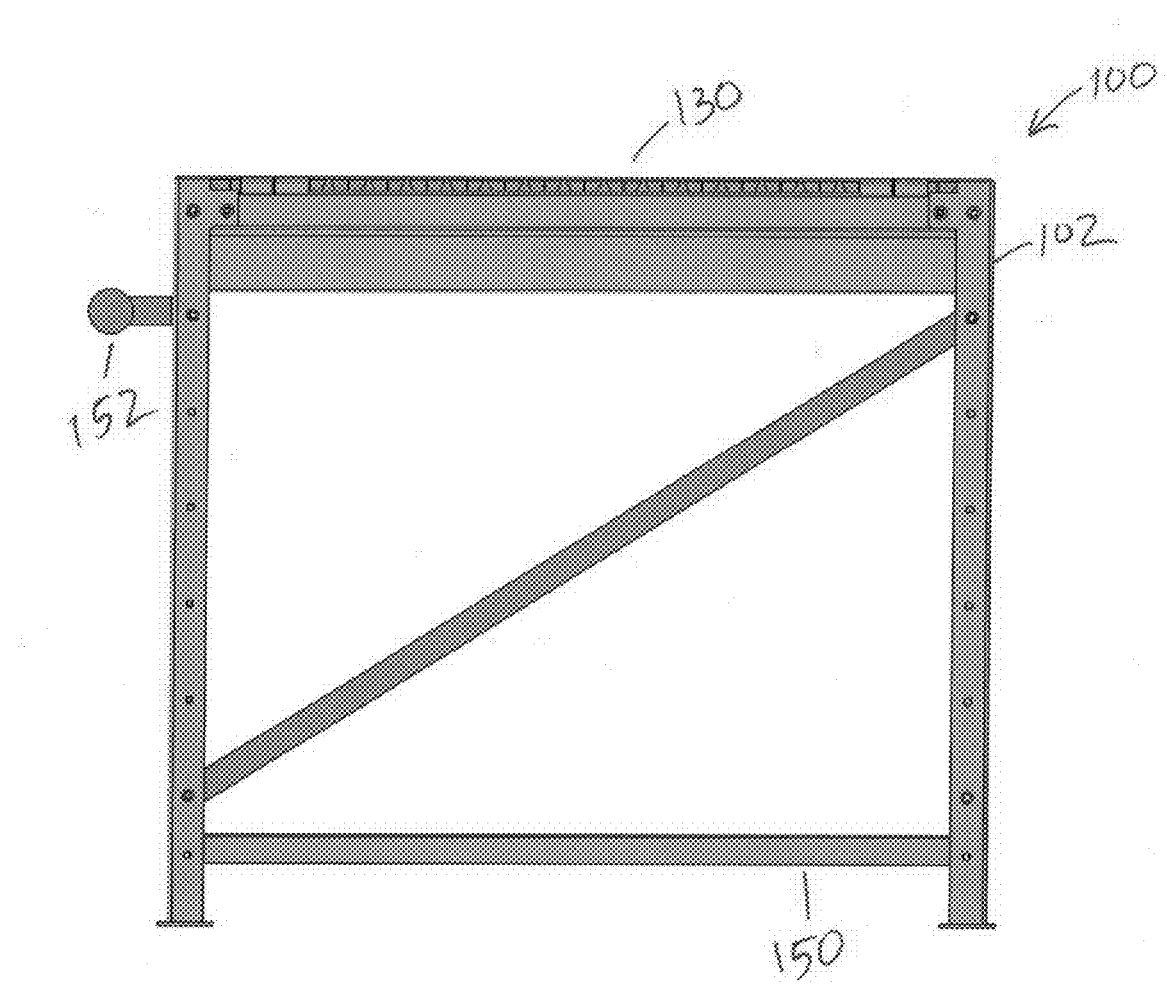
FIG. 4 is a rear view of the workstation of FIG. 1.
Figure 5:
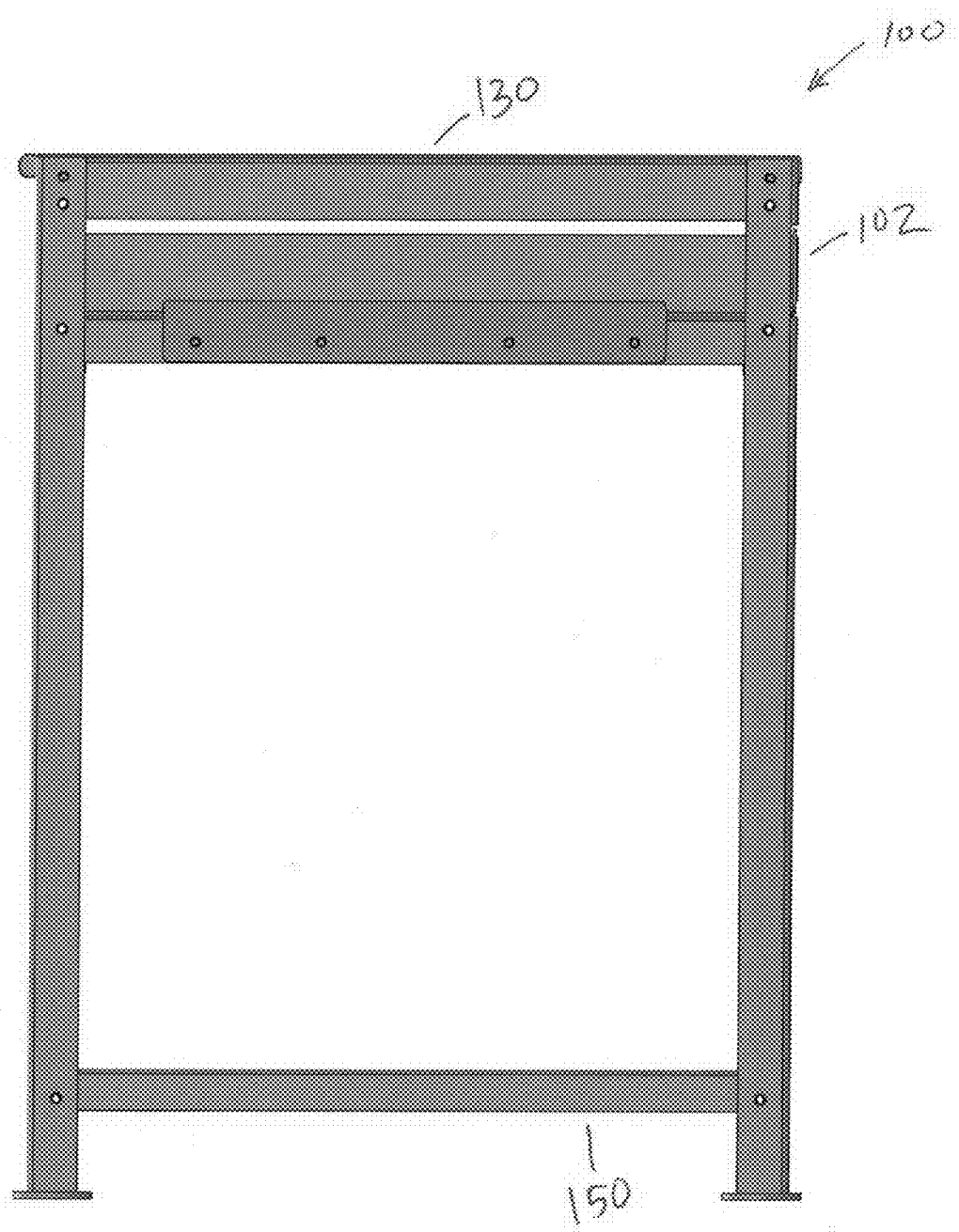
FIG. 5 is a left side view of the workstation of FIG. 1.
Figure 6:
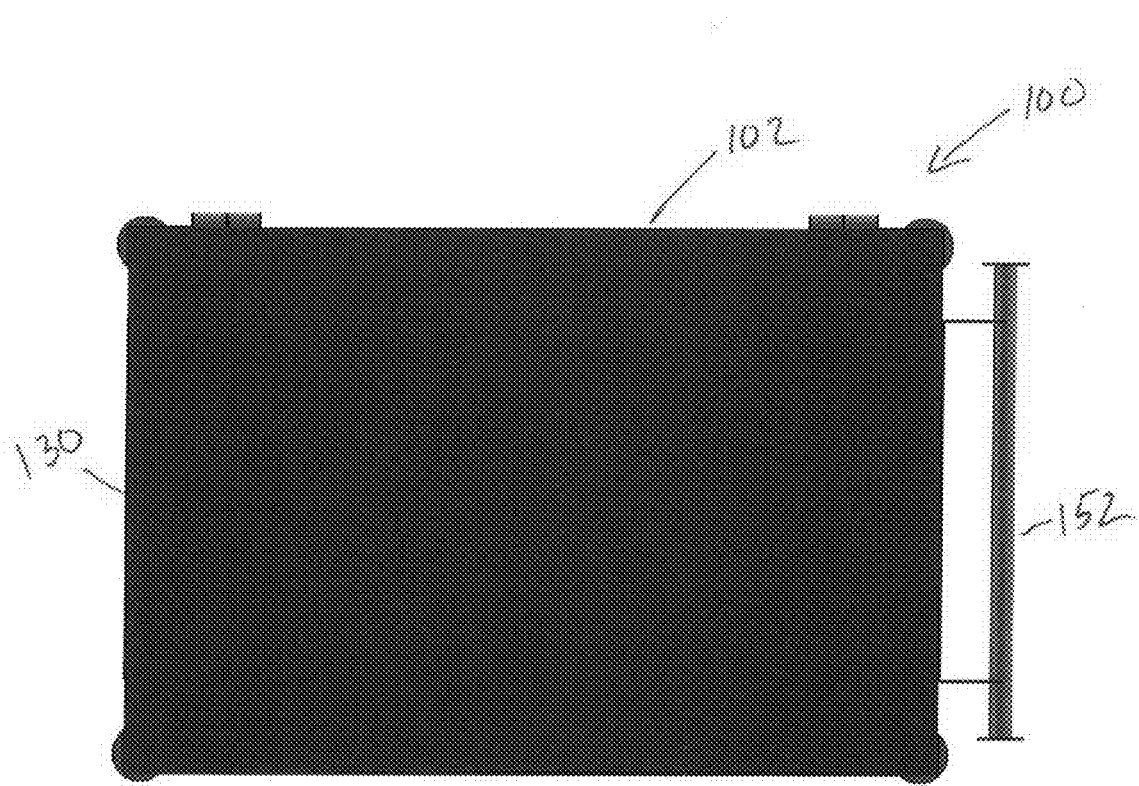
FIG. 6 is a top view of the workstation of FIG. 1.
Figure 7:
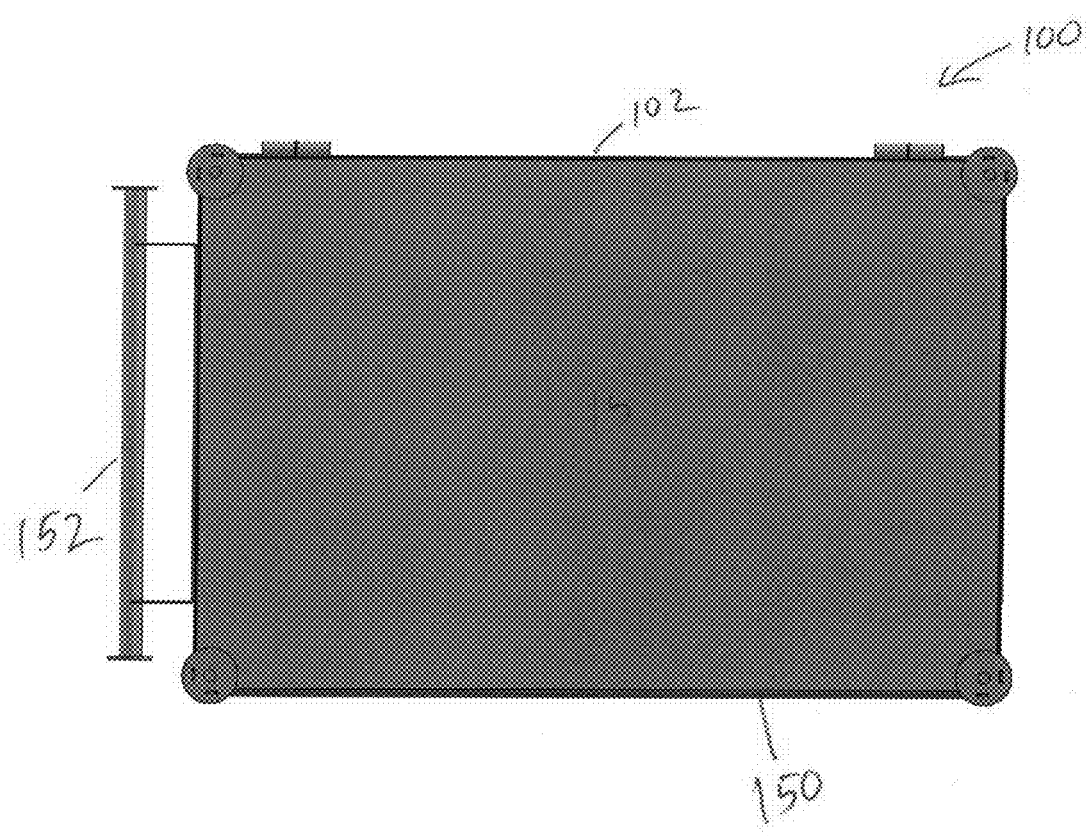
FIG. 7 is a bottom view of the workstation of FIG. 1.
Figure 6:
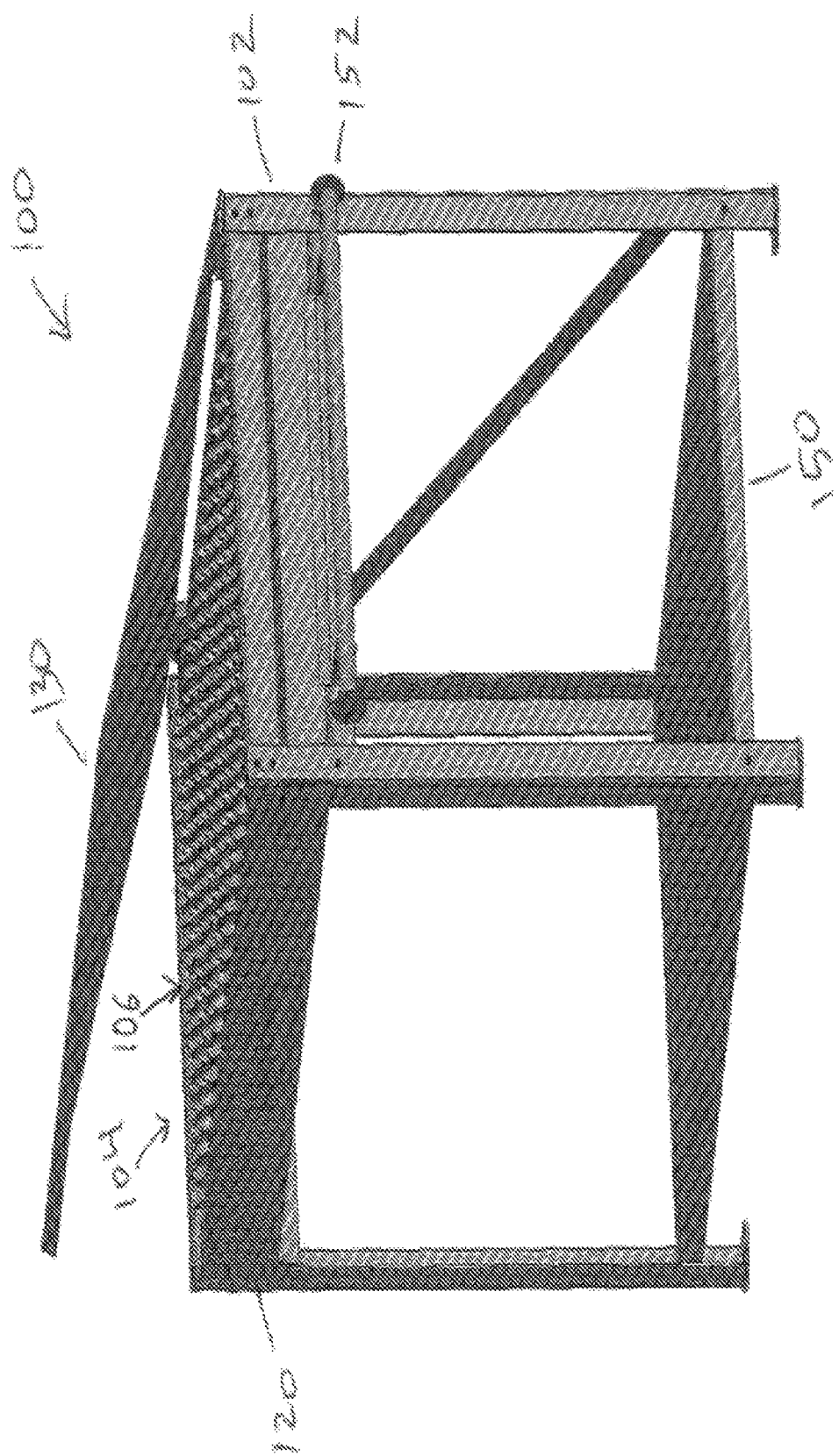
Figure 10:
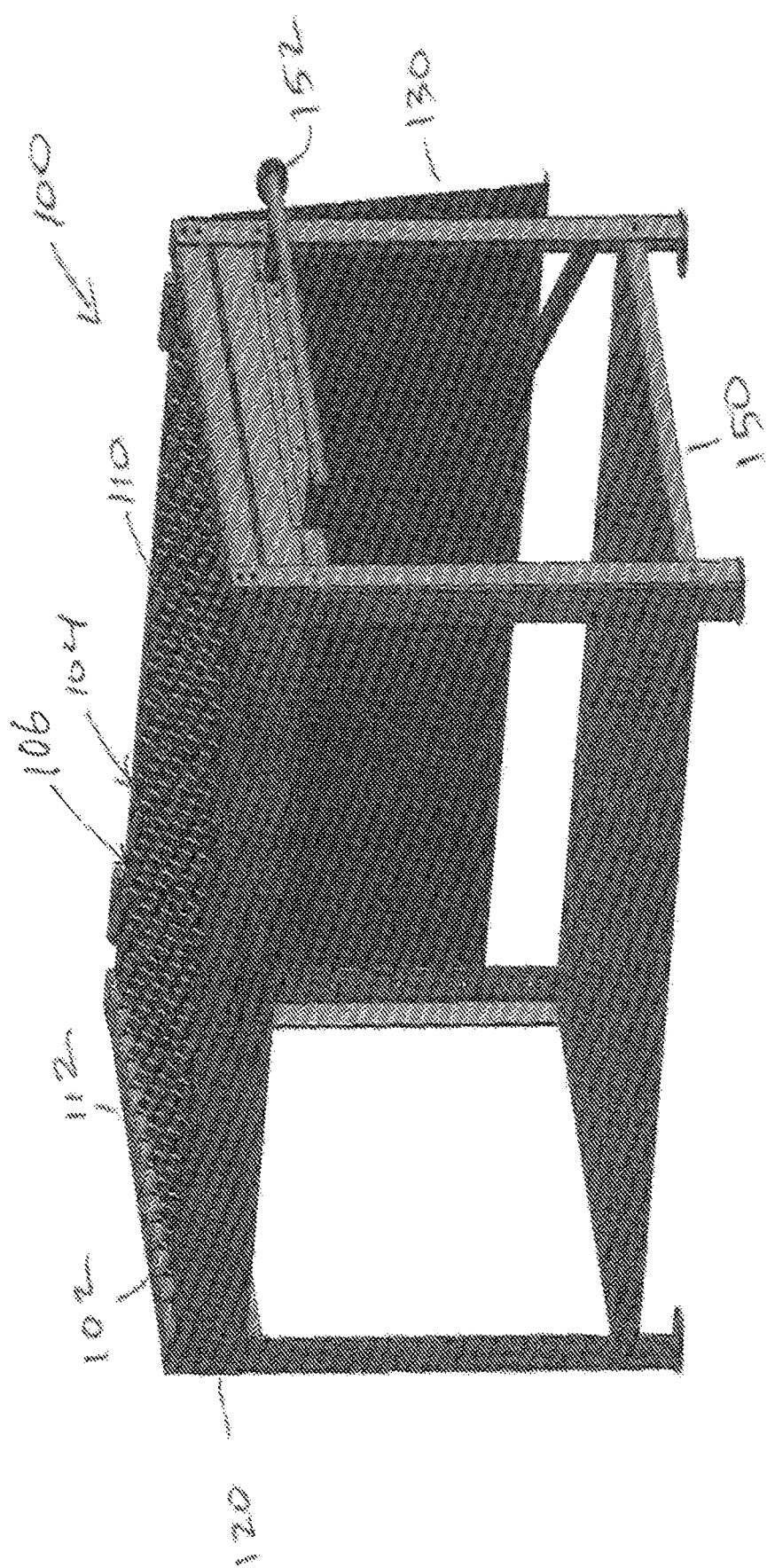
FIG. 10 is a right, front perspective view of the workstation of FIG. 1 with the cover removed.
Figure 11:
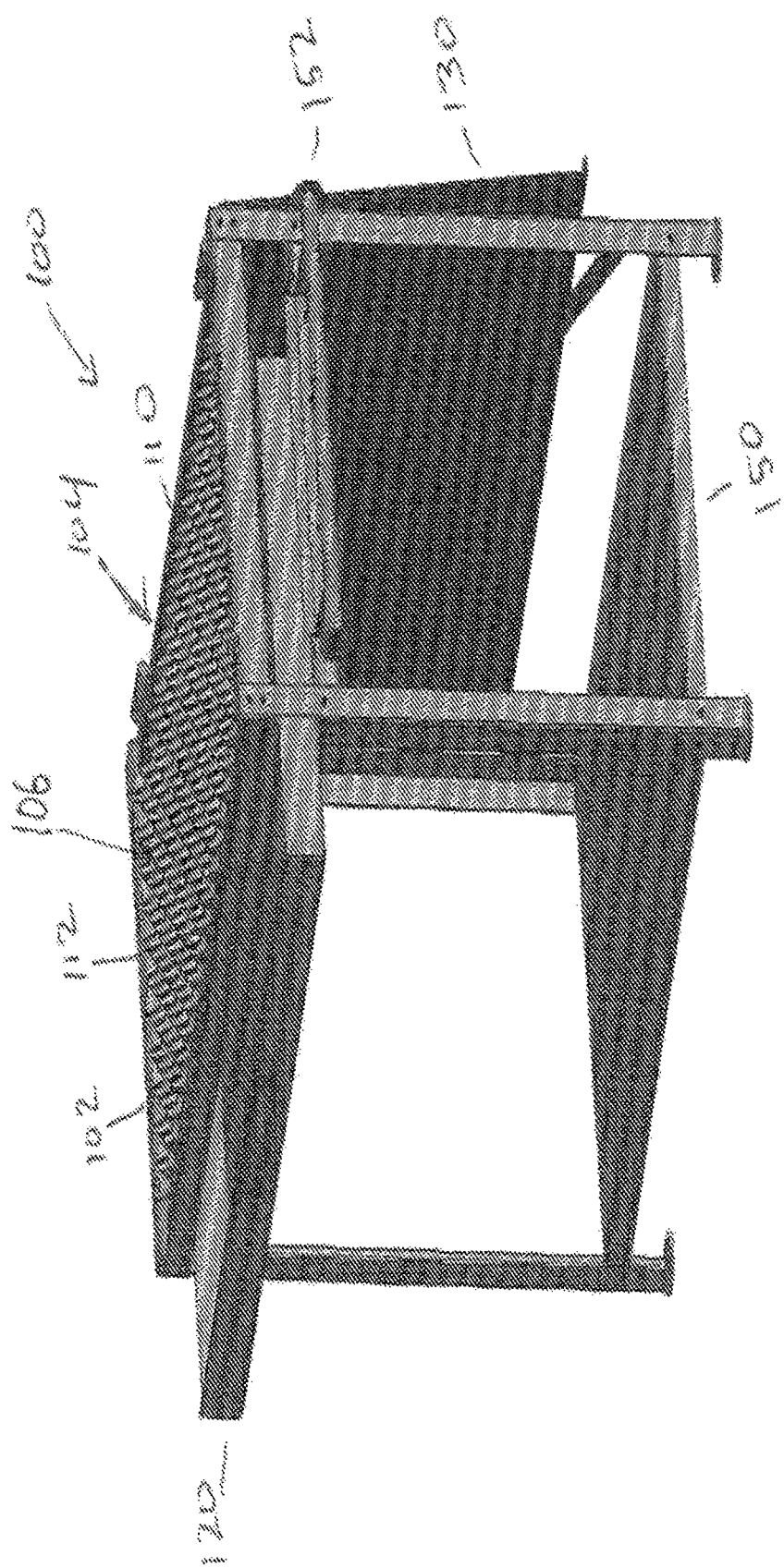
FIG. 11 is a right, front perspective view of the workstation of FIG. 1 with the cover removed and a tray partially opened.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Before the present inventive subject matter is described in further detail, it is to be understood that the invention is not limited to the particular embodiments described, and of course may vary. It is also to be understood that the terminology used herein is for the purpose of describing particular embodiments only, and is not intended to be limiting, since the scope of the present inventive subject matter will be limited only by the claims.

The current structures or workstations that are available to a user skilled in the art of metal working, and using any manually operated arc, and/or flame based cutting processes, are subject to dealing with hazardous molten slag and sparks produced during the manual arc, and/or flame based cutting processes. Commonly and accepted practice for those skilled in the art is to clamp the work piece to be cut, such that it is suspended off of the edge of a welding table or work bench for the duration of the manually-operated cutting process, thus exposing the user, to the hazardous molten metal spray and sparks that fall below the suspended work piece during the cut, and that are produced as a byproduct off the cutting process.

The inventive subject matter discussed herein provides multiple preferred embodiments that solve these problems. The preferred embodiment of the inventive subject matter solves the problem of known workstations not being capable of providing for, or serving the dual purpose use as a safe, supportive apparatus for metal working welding processes, as well as manually operated (electric) arc, and/or flame based metal working cutting processes of flat metal products. Additional preferred embodiments also provide a solution for the safe capture, containment, and subsequent removal of the hazardous molten slag and sparks produced during the manual arc, and/or flame based cutting processes, along with solutions and provisions for, optional structure for the purpose of an insert for welding or cutting gases, gas bottle storage & mounting, a lower shelf for placement of welding, metal cutting machinery, and general storage area, mounting points for optional casters to facilitate the mobilizing the workstation for movement and transport, and mounting points for one or more optional handles for welding and metal cutting machine cord storage, and ease of steerage when provisioned with casters for movement and transport. For example, for a workstation configured to allow Oxy-Acetylene cutting, two canister mounts would typically be used.

FIGS. 1-11 illustrates various views of a first embodiment of a multipurpose workstation 100 having a housing 102 that defines an interior space 104. The portable, non-CNC workstation 100 solves the problem by providing a structure that those skilled in the art would understand functions as a flat topped steel welding table or workstation that functions to support metal materials or products, for and during, metal working welding processes, or common "work bench" related activities.

A conductive, uneven surface 106 having a plurality of differing heights is preferably disposed within the interior space 104, and is defined by first and second sets of slats 110, 112 that intersect one another to form the conductive surface 106. The conductive surface 106 preferably has a plurality of openings 108 sized and disposed to provide for an air gap 140 within an opening or below the conductive surface 106. Preferably, the air gap 140 is sized to maintain the uninterrupted arc or flame of a plasma cutting or oxi-fuel gas cutting torch. The conductive surface can also be suitable for laser cutting as manually-operated, small scale laser cutting technology becomes available.

A tray 120 is disposed below the conductive surface 106 and configured to capture or collect material, specifically hazardous molten metal spray and sparks produced during the cut below the work piece, and which may pass through the openings. Preferably the tray 120 is movably coupled to the housing 102, such that the tray can be somewhat or entirely removed from the housing to allow for dumping of material collect and/or cleaning of the tray.

As the tray is situated directly below the cutting surface comprised of the supportive grid, the molten metal spray and sparks fall directly into the safety of the catch tray, thus protecting the user from the risk of injuries caused by the falling molten metal produced during the cutting process. This tray being constructed and contained within the enclosing frame of the workstation structure, in such a manner that allows for the catch tray to slide out of the workstation structure and be removed to accommodate the disposal of the hardened slag and metal waste created by the cutting process.

In some contemplated embodiments, the tray 120 can have walls such that water can be stored within the tray to absorb sparks and hot (or molten drips of) slag. In such embodiments, it is contemplated that the tray 120 could have an opening through which the water can drain, as well as a plug to close the opening when drainage isn't desired. The opening could further include a screen to prevent large material from entering the drain. In still further embodiments, the workstation 100 could have a recirculation system such that cool water is always present in the tray and replenished/cooled at a predetermined rate or as needed.

It is further contemplated that the workstation 100 can include a flat surface 130 that is disposed to cover the conductive, uneven surface. In preferred embodiments, the surface 130 is hingedly coupled to the housing 102, although in other embodiments, the surface 130 could be removably attached to the housing 102. The surface 130 preferably comprises stainless steel or derivatives thereof. In some contemplated embodiments, the flat surface 130 comprises a first material having a specific heat of at most 0.41 cal/gram° C. The flat surface 130 could further comprise a second material having a specific heat at least 0.7 cal/gram° C., and which surrounds the first material.

The flat surface 130 provides an upper flat metal surface of sufficient thickness to function as a welding table or work bench. This flat metal surface 130 also functions as a removable lid, covering the supportive metal grid below. The surface 130 is held in place with at least one connector, and allows for the workstation to be converted into a cutting table appropriate for the safe and supportive cutting of flat metal products with the use of a manually operated arc, and/or flame based cutting process.

The flat surface 130 also functions for a second purpose, namely the preparation of food products placed upon the flat surface 130 when used in the same embodiment as a heated griddle, by placing a radiant heat source in the tray 120 below the upper flat steel surface. (e.g. charcoal embers, or a fuel based gas burner). It is further contemplated that the tray 120 could be removed and a fuel-based gas burner or tray of charcoal could be inserted in its place.

It is further contemplated that the uneven surface can also be used for food preparation via a heat source disposed within the tray 120 or in place of the tray. For example, kebabs could be rested on the uneven surface and cooked via a heat source.

When the flat surface or cover 130 is removed, a conductive, uneven grid is exposed comprising first and second sets of slats 110, 112. The conductive, uneven grid creates a mobile metal cutting station configured to accommodate manual electrical arc based metal cutting systems. The plurality of metal slats comprising the uneven, conductive grid are suitable for supporting metal products during metal cutting processes.

The conductive, uneven surface defined by the supportive plurality of horizontal metal slats provides a sturdy surface for a user to place the intended work piece while also providing a air gap below the work piece. This air gap is important to being able to keep the cutting arc and/or flame stable enough to sustain the cut throughout its length, as any closing of the air gap will cause "arc blow back, or blow out" damaging the cut and scarring the flat surface that impeded the progress of the cutting arc and/or flame.

The conductive, uneven surface also allows for transferring of the electrical ground circuit, which the cutting machine requires to be completed through the work piece for the cutting arc to function. This is provided for, through the work piece being in contact with the uppermost points of the supportive metal grid while resting upon it. The conductive, uneven surface can therefore be in constant contact with the remainder of the metal structure which itself is grounded to the cutting machine through the machine's own ground clamp or work lead that can be disposed anywhere on the housing.

Figure 13:
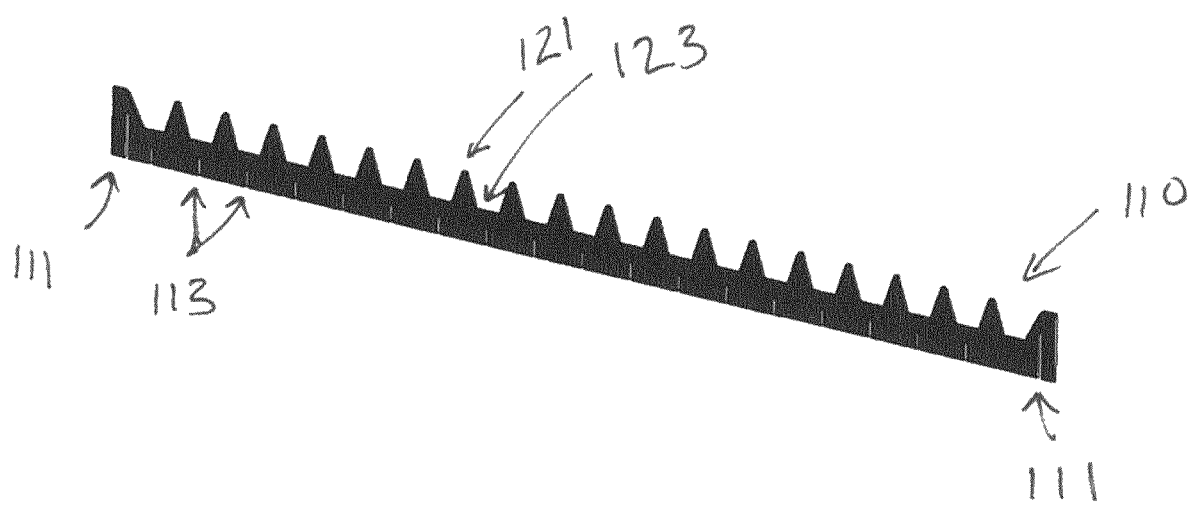
FIG. 13 is a front, longitudinal perspective view of one embodiment of a second support slat configured to mate with the with the support slat of FIG. 12.

The first set of slats 110 are preferably disposed parallel to one another within the interior space 104 to create a plurality of rows of a grid. Each of the slats 110 is removable from the housing 102 independently from the other slats of the first set. This advantageously allows for quick and easy replacement of one or more of the slats when needed. As shown in FIG. 13, each of the slats 110 have differing heights along the length comprising alternating peaks 121 and valleys 123. Preferably, each of the slats 110 also have slots or other attachment mechanism that allow the slots to mate with the housing 102 and with second set of slats 112. For example, the slats 110 could each have notches or slots 111 at either end portion of the slats 110 that allow the slats 110 to rest on the housing 102. The slats 110 could also have a set of notches 113 along their length that are configured to mate with notches 117 of a slat 112 of the second set.

The second set of slats 112 are also preferably disposed parallel to one another within the interior space 104 to create a plurality of columns of the grid. In addition, the second set of slats 112 are preferably oriented perpendicularly with respect to the first sets of slats 110 within the interior space 104 Each of the slats 112 is removable from the housing 102 independently from the other slats of the second set 112. This advantageously allows for quick and easy replacement of one or more of the slats when needed. As the slats of the first set 110 are placed on top of the second set of slats, the first set of slats would have to be removed prior to removing one of the slats of the second set 112. Of course, the specific arrangement of the notches of the first and second sets 110, 112 could be reversed without departing from the scope of the invention.

Figure 12:
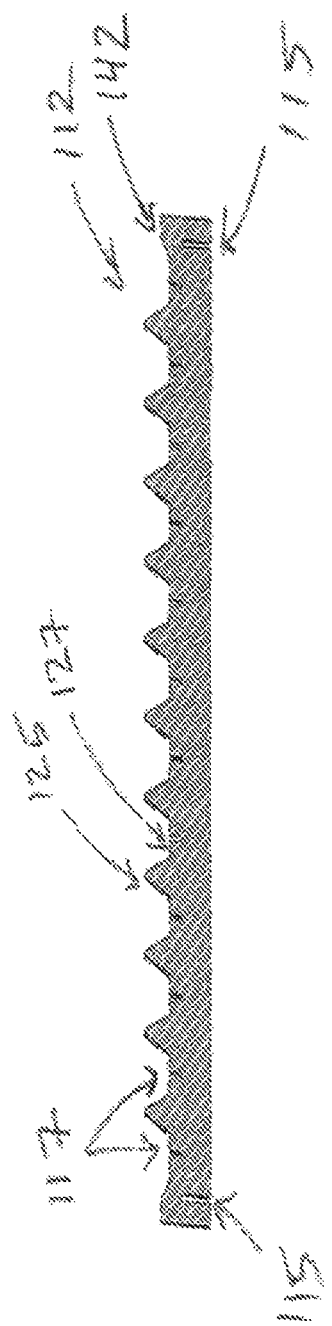
FIG. 12 is a right side, lateral perspective view of one embodiment of a support slat.

As shown in FIG. 12, each of the slats 112 have differing heights along the length comprising alternating peaks 125 and valleys 127, and comprising a regular, uneven surface 142 having different heights along a length of the slat 112. Preferably, each of the slats 112 also have slots or other attachment mechanism that allow the slots to mate with the housing 102 and with the first set of slats 110. For example, the slats 112 could each have notches, grooves, or slots 115 at either end portion of the slats 112 that allow the slats 112 to rest on the housing 102. The slats 112 could also have a set of notches 117 along their length that are configured to mate with notches 113 of a slat 110 of the first set.

In this manner, each of the slats of the first set 110 will intersect with each of the slats of the second set 112, as shown in FIG. 9. It is contemplated that the intersection creates a regular uneven surface having the plurality of openings, although an irregular uneven surface is also contemplated.

The workstation 100 can further include a lower shelf 150 disposed below the tray 120 for placement of welding, metal cutting machinery and providing a general storage area. Items stored here are generally safe from sparks and other byproducts of the cutting processes due to the presence of the tray 120.

Although not shown, housing 102 can have two or more wheels disposed at a bottom of housing 102 to allow for quick movement of the workstation 100. In such cases, handle 152 can be used to lift one side of the workstation 100 and casters/wheels can be placed on an opposite side to allow for movement of the workstation 100. In other embodiments, each corner of the workstation can have a wheel and the handle 152 could be used to simply push the workstation to a new location. In such embodiments, it is contemplated that one or more wheel locks could be used to prevent unintentional movement of the workstation 100.

Handle 152 can optionally also be used for cord storage or welding and metal cutting machines.

Figure 14:
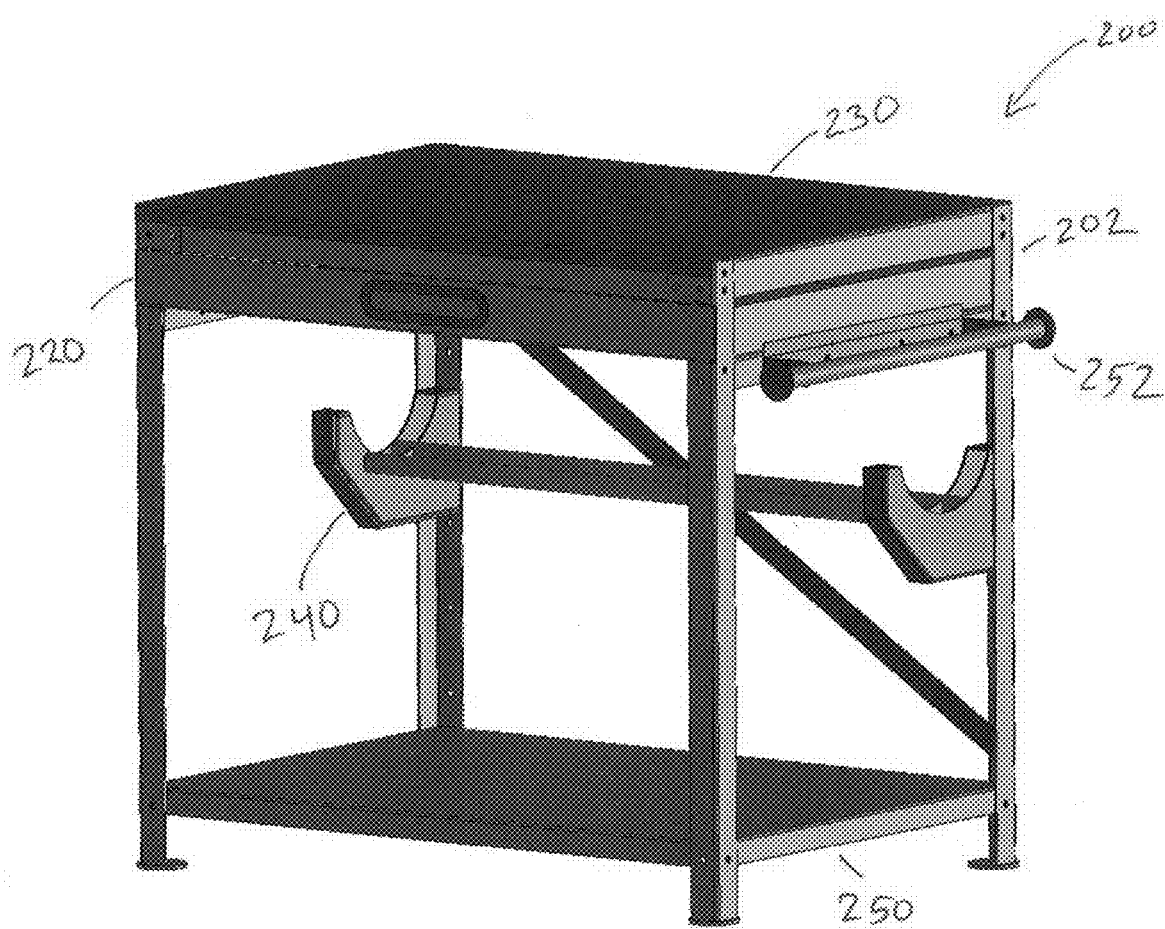
FIG. 14 is a right, front perspective view of another embodiment of a workstation in a closed station and having an optional storage for a canister or container.
Figure 15:
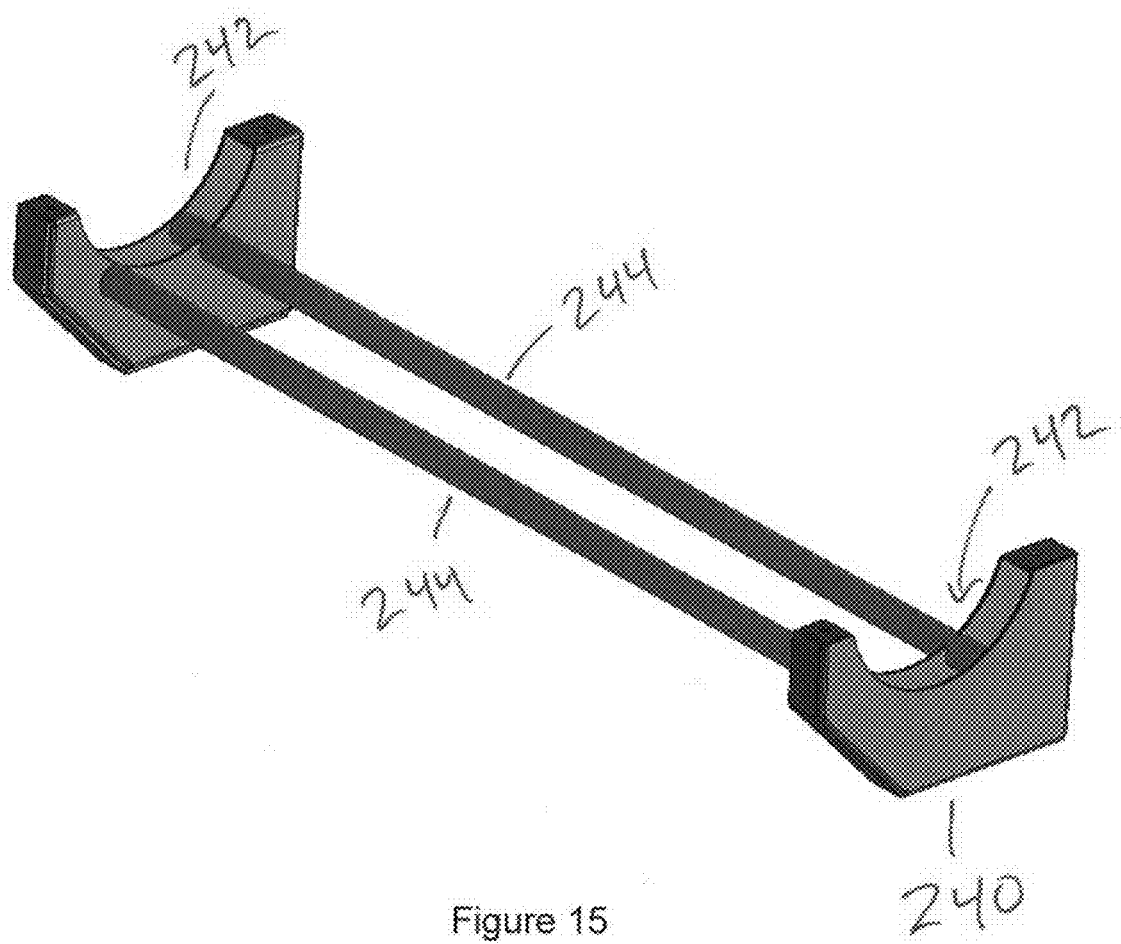
FIG. 15 is a front, longitudinal perspective view of the storage shelf shown in FIG. 14.

FIG. 14 illustrates another embodiment of a workstation 200 having a structure or shelf 240 configured to hold a canister or container. For example, the shelf 240 can hold or store an inert gas bottle for welding. FIG. 15 illustrates a close up view of the shelf 240 having first and second ends 242 that are connected via one or more bars 244. Preferably each of the ends 242 has a recessed area sized and dimensioned to allow a canister to rest when stored.

Methods of cutting a piece of material using a manually-operated cutting process are also contemplated. In one contemplated embodiment, a multi-purpose workstation can be provided having a housing defining an interior space. A conductive, uneven surface such as that described above can be disposed within the interior space. Preferred surfaces have a plurality of differing heights with a plurality of openings sized and disposed to provide for an air gap. A tray can be disposed below the surface and configured to collect material that passes the openings.

A user can be instructed to place a material on the conductive, uneven surface, and then cut the material using a manually-operated arc or a flame-based metal cutting process, wherein the openings are sized and disposed to provide an air gap below all or a portion of the material.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, specific compositions and methods of the described multipurpose apparatus for welding, metal cutting, and food preparation use have been disclosed. It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A multipurpose workstation, comprising:
 a housing defining an interior space;
 a conductive, uneven surface having a plurality of differing heights that is disposed within the interior space, wherein the surface comprises a plurality of openings sized and disposed to provide for an air gap within an opening or below the surface;
 wherein the conductive, uneven surface comprises a first set of parallel slats that are each removable from the housing without removing other slats of the first set, and a second set of parallel slats that are each removable from the housing without removing other slats of the second slat;
 wherein each of the slats of the first and second sets having differing heights along a length of the slat;
 wherein each slat of the second set intersects the slats of the first set and are oriented substantially perpendicular to the first set of parallel slats to form a grid;
 wherein each slat of the first set of slats comprises a top surface and a bottom surface, and wherein each slat of the first set of slats comprises a first series of peaks disposed on the top surface between adjacent valleys, and wherein at least some of the valleys comprise a first notch on the top surface;
 wherein each slat of the second set of slats comprises a top surface and a bottom surface, and wherein each slat of the second set of slats comprises a second series of peaks disposed on the top surface between adjacent valleys, and wherein at least some of the valleys comprise a second notch on the bottom surface, and wherein each of the second notches is configured to be received within one of the first notches, such that the point where each of the first and second slats interconnect is at a valley of each of the first and second slats; and
 a tray disposed below the surface and configured to collect material that passes through the openings.

2. The workstation of claim 1, wherein the first set of parallel slats have differing heights.

3. The workstation of claim 1, wherein the first set of parallel slats have slots that mate with the housing.

4. The workstation of claim 3, wherein the slots mate with grooves formed in the housing.

5. The workstation of claim 1, wherein the conductive, uneven surface comprises a regular uneven surface forming the grid with the plurality of openings.

6. The workstation of claim 1, further comprising a flat surface hingedly or removably coupled to the housing and disposed to cover the conductive, uneven surface.

7. The workstation of claim 6, wherein the flat surface comprises stainless steel or a derivative thereof.

8. The workstation of claim 1, further comprising a shelf or support disposed underneath the surface that is sized and disposed to hold a gas container.

9. The workstation of claim 1, wherein the surface is further configured to allow for food preparation.

10. The workstation of claim 1, wherein the grid is further configured to allow for food preparation.

11. The workstation of claim 3, wherein each of the first set of parallel slats have a peak disposed at each end of the slat, and wherein the slots are disposed beneath the peak at each end of the slat.

* * * * *